United States Patent [19]

Fry

[11] Patent Number: 4,745,701
[45] Date of Patent: May 24, 1988

[54] FISHING DEVICE

[76] Inventor: Jewell C. Fry, Rte. 2, Box A-18, Osage Beach, Mo. 65065

[21] Appl. No.: 15,730

[22] Filed: Feb. 17, 1987

[51] Int. Cl.$^4$ .............................................. A01K 91/04
[52] U.S. Cl. .................................. 43/42.49; 43/44.86
[58] Field of Search ................... 43/17.2, 42.08, 42.28, 43/42.31, 42.32, 42.37, 42.39, 42.41, 42.49, 44.86, 44.87, 44.95, 44.83; 24/116 A, 130, 266

[56] References Cited

U.S. PATENT DOCUMENTS

| 1,419,043 | 6/1922 | Gray | 24/116 A |
|---|---|---|---|
| 2,152,971 | 4/1939 | Parkins | 43/42 |
| 2,263,089 | 9/1956 | McDonald | 43/44.86 |
| 2,442,472 | 6/1948 | Sagan | 24/116 A |
| 2,869,278 | 1/1959 | Cook | 43/44.86 |
| 2,955,379 | 6/1958 | Hull | 43/42.35 |
| 3,091,885 | 7/1960 | Ulsh | 43/42.52 |
| 3,332,163 | 7/1967 | Stewart et al. | 43/44.86 |
| 4,177,598 | 12/1979 | Jolley | 43/44.95 |
| 4,453,336 | 6/1984 | Lowden . | |

Primary Examiner—M. Jordan
Attorney, Agent, or Firm—Senniger, Powers, Leavitt and Roedel

[57] ABSTRACT

A fishing device comprising a body and a hook attached to the body. The body has an elongate hollow recess therein for holding a knot on a fishing line and a slot in the outer surface of the body extending generally parallel to the recess and communicating therewith. An entrance is provided to the recess at one end of the slot through which the knot may be inserted into the recess. The recess is sized readily to receive the knot via the entrance with the knot being movable in the recess to a position spaced from the entrance whereby the line extends from the recess outwardly through the slot with the side walls of the slot gripping the line thereby retaining the knot in the recess.

13 Claims, 1 Drawing Sheet 4,745,701

FISHING DEVICE

BACKGROUND OF THE INVENTION

This invention relates generally to fishing devices, such as fishing hooks and lures, and more specifically to an improved fishing device especially adapted for easy connection to a fishing line.

Attaching a fishing line to a fishing device can be difficult and frustating, since only a small eyelet is usually provided. The line must be threaded through the eyelet, which generally requires a steady hand and the same hand-eye coordination necessary to thread a needle. Frequently, this is impractical or impossible for people with poor eyesight and/or arthritis. A number of approaches to this problem are disclosed in the inventor's prior U.S. Pat. No. 4,535,562, which shows a number of devices for "attaching a hooked item for catching fish or the like to a line with a knot therein". While these devices facilitate attaching hooks and lures to fishing lines, in the case of fishing lures, they require that a framework be secured to or formed with the lure. In addition, the framework of the devices are formed of metal wire, which has a tendency to break fishing line if the line is excessively pinched by the wire. As a consequence, the devices of the inventor's prior U.S. patent must be manufactured very carefully so that excessive pinching of fishing line is avoided.

SUMMARY OF THE INVENTION

Among the several objects of the invention may be noted the provision of a fishing device which may be attached to a fishing line without being threaded through a small eyelet; the provision of such a device which is adapted for holding a fishing line having a knot therein; the provision of such a device which can hold a fishing line with minimal risk that it will excessively pinch or break the line; the provision of such a device which is of simple construction; the provision of such a device which is durable and reliable; and the provision of such a device which is economical to manufacture and simple to use.

Generally, a fishing device of the present invention comprises a body and a hook attached to the body. The body has an elongate hollow recess therein for holding a knot on a fishing line and a slot in the outer surface of the body extending generally parallel to the recess and communicating therewith. The slot has closely spaced side walls. An entrance is provided to the recess at one end of the slot through which the knot may be inserted into the recess. The recess is sized readily to receive the knot via the entrance with the knot being movable in the recess to a position spaced from the entrance whereby the line extends from the recess outwardly through the slot with the side walls of the slot gripping the line thereby retaining the knot in the recess.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF A PREFERRED EMBODIMENT

Figure 1:
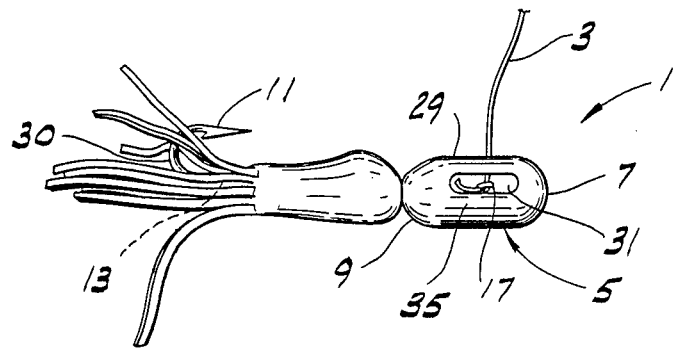
FIG. 1 is a side elevation of a fishing device of the present invention.

Referring now to the drawings, a fishing lure of the present invention is designated in its entirety by the reference numeral 1. It will be understood that the invention is not limited to fishing lures, the following description applying also to other fishing devices, such as fish hooks adapted for use with live or imitation bait. The fishing lure 1 is especially adapted to be attached to a fishing line 3 without being threaded through a small eyelet. As shown in FIG. 1, the fishing lure 1 generally comprises a preferably elongate or generally cylindric body 5 having rounded forward and rearward ends 7 and 9, respectively, and a hook 11, the shank 13 of which extends endwise from the rearward end 9 of the body. The body 5 has an elongate hollow recess 15 therein, the recess being sized readily to receive and hold a knot 17 on fishing line 3.

Figure 3:
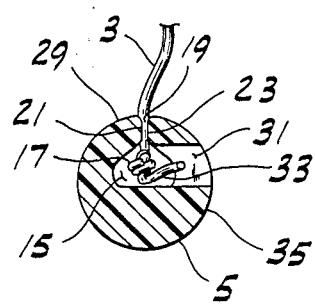
FIG. 3 is an enlarged cross-section along line 3—3 of FIG. 2.

As shown in FIG. 3, a narrow slot 19 is provided in the outer surface of the body 5, the slot being defined by side walls 21 and 23 generally adjacent the outer surface of the body 5. The slot 19 extends generally parallel to the recess 15 and communicates with the recess substantially throughout its length. The side walls 21 and 23 of the slot 19 are closely spaced for gripping the line 3 therebetween thereby to retain the knot 17 in the recess 15. Preferably, side walls 21 and 23 are flared outwardly adjacent the outer surface of the body 5 so that the fishing line 3 is not pushed against a sharp corner when, for example, a fish bites the lure.

Figure 2:
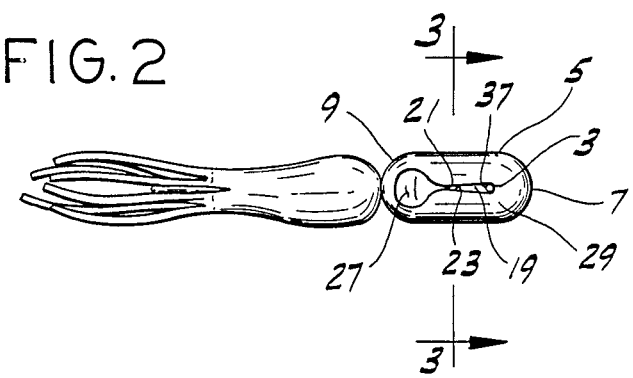
FIG. 2 is a top plan of the fishing device of FIG. 1.

An entrance 27 to the wide portion is provided for inserting the knot 17 into the recess 25. As shown in FIG. 2, the entrance 27 is located at the rearward end of the slot 19 and is substantially larger in size than the width of the slot. So that line 3 can be pulled forwardly through the slot 19 to a position sufficiently spaced from the entrance 27 to ensure that knot 17 is securely held in the recess 15, the length of the slot should be at least 3/16 inch (5 mm).

Preferably, the body 5 is generally resilient adjacent the slot 19 so that the side walls 21 and 23 expand slightly to receive the line 3 and to grip the line to retain it. For example, the body 5 may be integrally formed of plastic material, such as nylon, in which case the entire body would be generally resilient. It will be understood that "integrally formed" as used herein means formed of or in one contiguous or continuous piece. It does not include fastening a number of different pieces together to form one assembly.

If slot 19 is formed along the upper surface 29 of the body 5, the bend 30 of hook 11 should curve upwardly and forwardly from its shank 13 to avoid snagging weeds and debris when fishing. It is also believed that this slot/hook relationship of the lure is helpful for burying the hook in the flesh of a fish's mouth.

The body 5 preferably has an elongate opening 31 to the recess 15 for receiving excess portions 33 of the knot 17 and/or fishing line 3. When the slot 19 is formed along the upper surface 29 of the body 5, the opening should be formed through a side surface 35 of the body. While it is contemplated that the recess 15, slot 19, entrance 27 and opening 31 would be molded in the body 5 as the body is formed, they may instead be machined in a previously molded body. In the latter case, the opening 31 and recess 25 would be machined in one step.

To attach the fishing lure 1 to the line 3, the line is first tied to form knot 17 adjacent the end of the line. The knot 17 is inserted through entrance 27 into the recess 15. The line 3 is then pulled forwardly into and through the slot 19, the knot 17 thereby being pulled forwardly through the recess 15. The lure 1 is ready for fishing when the line 3 extends from the recess 15 laterally outwardly through the forward end 37 of the slot 19. In the case of a fish hook (not shown) of the type to which live or imitation bait is attached, the fishing line would extend endwise from the shank of the hook through the slot. It will be observed that the resiliency of the lure body 5 will hold the fishing line 3 at the forward end 37 of the slot 19. In addition, a fish would tend to pull the lure 1 rearwardly as it attempts to escape, since the hook 11 is bent upwardly and forwardly. As a result, the line 3 would tend to be pulled forwardly against the forward end 37 of the slot 19.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A fishing device comprising a body and a hook attached to the body, said body having an elongate hollow recess therein for holding a knot on a fishing line, a slot in the outer surface of the body extending generally parallel to said recess and communicating therewith, said slot having closely spaced side walls, and an entrance to said recess at one end of said slot through which said knot may be inserted into the recess, said recess being sized readily to receive said knot via said entrance with the knot being movable in the recess to a position spaced from said entrance whereby the line extends from said recess outwardly through the slot with said side walls gripping said line thereby retaining said knot in said recess.

2. A fishing device as set forth in claim 1 wherein said body is generally resilient adjacent said slot whereby said side walls are adapted to expand slightly to receive siad line and to grip the line to retain it.

3. A fishing device as set forth in claim 2 wherein said body is integrally formed of plastic material.

4. A fishing device as set forth in claim 1 wherein said body is elongate having forward and rearward ends, said slot extending forwardly from said entrance.

5. A fishing device as set forth in claim 4 wherein said hook is at said rearward end of the body, said hook having a shank extending endwise from the rearward end of said body.

6. A fishing device as set forth in claim 5 wherein said slot is along the upper surface of said body, said hook having a bend curving upwardly and forwardly from its shank.

7. A fishing device as set forth in claim 6 wherein said body is generally resilient adjacent the slot whereby said side walls are adapted to expand slightly to receive said line and to grip the line to retain it.

8. A fishing device as set forth in claim 7 wherein said body is integrally formed of plastic material.

9. A fishing device as set forth in claim 4 wherein said body is generally cylindric having rounded forward and rearward ends.

10. A fishing device as set forth in claim 9 wherein said hook has a shank extending endwise from the rearward end of said body.

11. A fishing device as set forth in claim 1 wherein said body has an opening to the recess for receiving excess portions of said knot and/or fishing line.

12. A fishing device comprising a body and a hook attached to the body, said body having a elongate hollow recess therein for holding a knot on a fishing line, a slot in the outer surface of the body extending generally parallel to said recess and communicating therewith, an opening to the recess for receiving excess portions of said knot and/or fishing line, said opening being through a side surface of the body with the slot along the upper surface of said body, and an entrance to said recess at one end of said slot through which said knob may be inserted into the recess, said recess being sized readily to receive said knot via said entrance with the knot being movable in the recess to a position spaced from said entrance whereby the knot is held captive in the recess with the line extending from said recess outwardly through said opening.

13. A fishing device as set forth in claim 12 wherein said opening is elongate.

* * * * *